Figure 1:
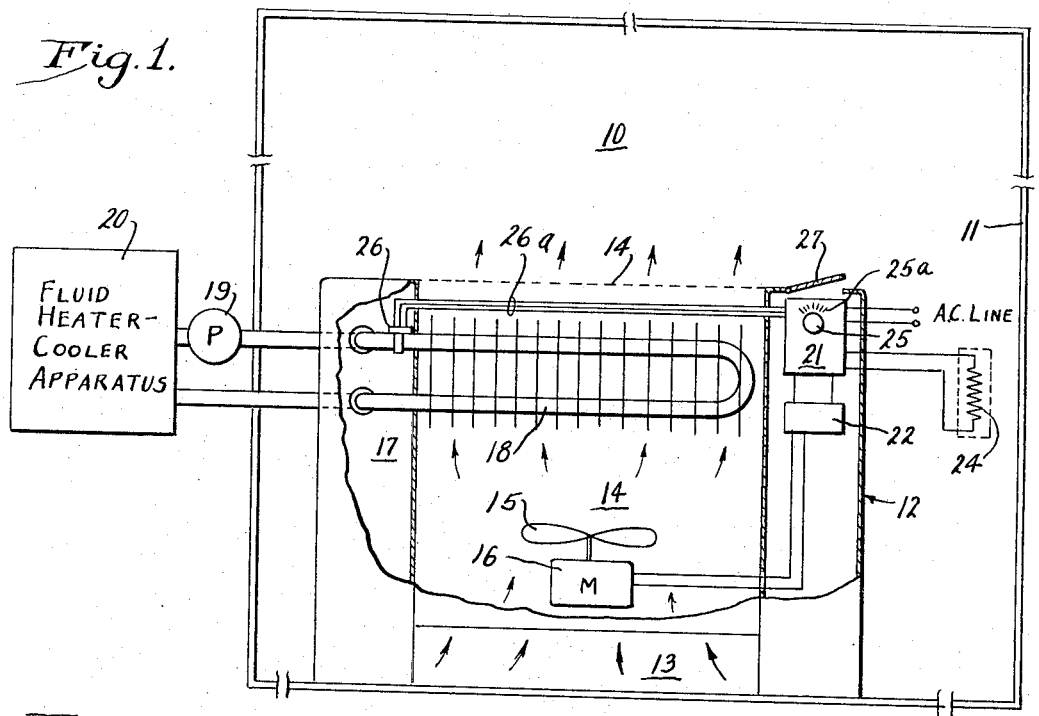

April 9, 1968

T. J. TVEIT 3,377,545

THERMOSTATIC TRANSDUCER FOR WINTER AND SUMMER OPERATION

Filed Jan. 17, 1966

INVENTOR.
Theodore J. Tveit
BY
Wolfe, Hubbard, Voit & Osann
ATTORNEYS

United States Patent Office 3,377,545
Patented Apr. 9, 1968

3,377,545
THERMOSTATIC TRANSDUCER FOR WINTER
AND SUMMER OPERATION
Theodore J. Tveit, Rockford, Ill., assignor to Barber-Colman Company, Rockford, Ill., a corporation of Illinois
Filed Jan. 17, 1966, Ser. No. 521,196
6 Claims. (Cl. 323—19)

The present invention relates generally to the art of temperature control systems, and more particularly to systems in which the temperature of an enclosure or object is controlled by varying either the rate of heating (winter operation) or the rate of cooling (summer operation).

In temperature control systems of this type, a thermostatic transducer is employed to sense the actual temperature of the controlled enclosure or object, and to produce a control signal which by its departure from an equilibrium value is indicative of the error between the actual temperature and the desired or set point temperature. The control signal is utilized to correctively change the actual temperature. In systems controlling both heating in winter and cooling in summer there must be a complete change in basic relationships for summer operation as compared with winter operation. That is, in winter when the actual temperature of the enclosure or object is lower than the desired set point, so there is a negative temperature error, the system must act to increase the rate of heating (e.g., flow of heating fluid or hot air) to reduce the error to zero. By contrast, in summer when the actual temperature of the enclosure or object is lower than the desired set point, so there is a negative temperature error, the system must act to decrease the rate of cooling, e.g., by reducing the flow of cooling fluid or cool air, so that the actual temperature rises to the set point due to heat transfer from the surrounding atmosphere. In general, the modification of control apparatus so that it operates in one mode or the other is called "summer-winter changeover."

It is the principal object of the present invention to provide a proportional thermostatic transducer for selective winter or summer operation and characterized by extreme simplicity, low-cost, and reliability.

A related object of the invention is to realize and make possible such a winter-summer thermostatic transducer wherein one single pole, double throw switch is the only element which need be actuated to convert from the winter to the summer mode of operation, or vice versa.

It is another object to provide such a thermostatic transducer in which the temperature-sensing or thermostatic element may be a single, simple and reliable temperature-sensitive resistor or thermistor which acts as the basic control element during both winter and summer modes of operation.

Still another object is to provide such a thermostatic transducer in which set point, calibration, and throttling range adjustments may be made by setting standard potentiometers or rheostats, such adjustments being effective for both winter and summer modes of operation.

Figure 2:
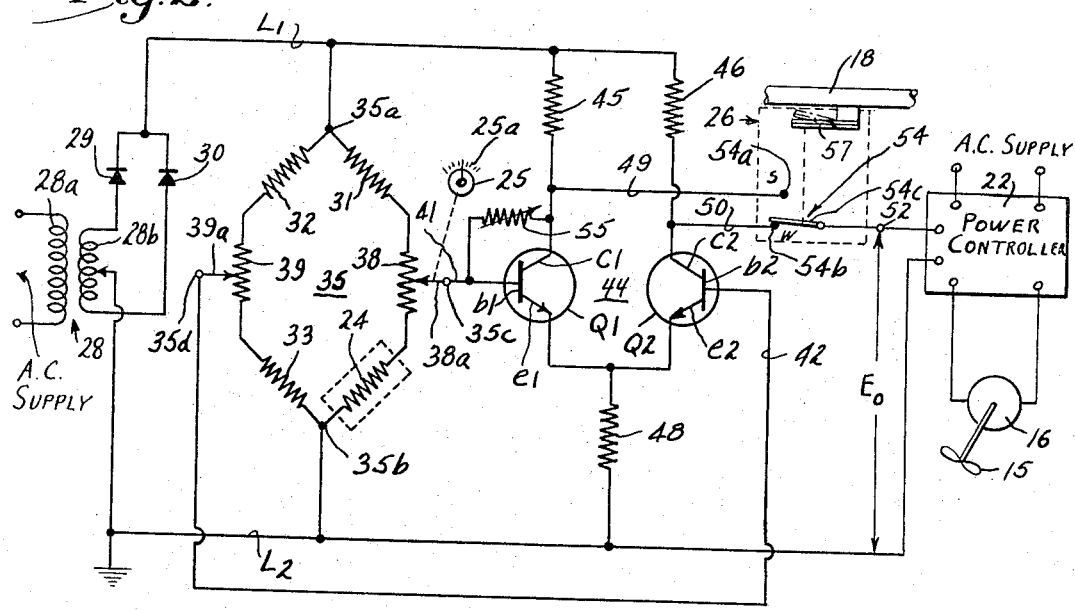

Other objects and advantages will become apparent as the following description proceeds with reference to the accompanying drawing, in which:

FIGURE 1 is a diagrammatic illustration of an enclosure and a temperature control system therefor, being exemplary and typical of the many specific arrangements in which the thermostatic transducer of the present invention will find advantageous use; and FIG. 2 is a schematic circuit diagram of a thermostatic transducer embodying the present invention and shown as controlling a fan motor.

While the invention has been shown and will be described in some detail with reference to a particular embodiment thereof, there is no intention that it thus be limited to such detail. On the contrary, it is intended here to cover all variations, modifications and equivalents falling within the spirit and scope of the invention as defined by the appended claims.

Referring now to FIG. 1, a typical system utilizing the thermostatic transducer of the present invention is there illustrated as controlling the temperature of an enclosure or room 10 bounded by walls 11. Air is forced to circulate through a heat exchanger 12 having a bottom inlet 13 and an upper outlet 14 by a fan 15 driven by a controllable speed motor 16, the air thus passing over a finned coil 18 through which a heat exchange fluid is forced by a constantly driven pump 19. The fluid (for example, water) in passing through a heater-cooler apparatus 20 is either heated considerably above ambient temperature in winter, or cooled considerably below ambient temperature in summer, and it may be assumed that in each case such fluid circulates through the coil 18 at a substantially constant rate and with a substantially constant temperature. Because the heater-cooler apparatus 20 may take any one of a variety of forms well known to those skilled in the art, such apparatus has not been shown in detail. It will suffice to understand simply that the heater-cooler apparatus 20 may be selectively conditioned so that it operates to heat or cool the circulating fluid under winter or summer conditions, respectively.

To control the temperature in the room 10, the rate of air circulation is varied by causing the fan motor 16 to operate at different speeds. Thus, as the fan is driven faster under winter conditions, the rate of heat transfer from the coil 18 to the circulating air will increase, and the temperature of the room 10 will go up. But as the fan is driven faster under summer conditions, the rate of heat withdrawal from the air to the coil will increase, and the temperature of the room 10 will go down. By suitably adjusting and controlling the fan speed, a desirable set point temperature in the room will be achieved and maintained.

In order properly to control and maintain the rate of heating or cooling so as to reach and maintain a desired or set point room temperature, a thermostatic transducer 21 is employed to produce a control signal which varies from a steady state value according to the difference or error between the actual and set point temperatures. Such transducer is only diagrammatically shown in FIG. 1 as supplying a controlling input signal to a power controller 22 which in turn energizes the motor 16 so that the latter runs at speeds determined by the heating or cooling rate necessary to reach and maintain the desired temperature. The transducer includes a temperature-sensitive electric element whose impedance or resistance varies according to its environmental temperature, such element being disposed in the room 10 so as to be responsive to the actual temperature existing therein. Although any one of a wide variety of temperature-sensing elements may be employed, a thermistor 24 is shown in FIG. 1. It is a well known characteristic of a thermistor that its resistance varies inversely with changes in the temperature which it senses.

A rotatable knob 25 may be provided on the exterior of the housing for the transducer 21 to afford adjustments in the set point temperature with reference to a numerical indicia scale 25a, such knob being readily accessible through a hinged door 27 in the casing for the heat exchanger 12. A changeover switch unit 26 is employed to place the transducer 21 in either the winter or summer mode of operation, such unit preferably being one which is clamped to the coil 18 and having a temperature-sensitive actuator, such as a bimetal element (not shown), responsive to the circulating fluid being relatively hot or cold in winter or summer. The switch unit 26 is connected by wires 26a to the transducer 21 and includes a single-pole, double-throw switch to be described in more detail below.

An exemplary embodiment of the thermostatic transducer 21 is shown in more detail by the schematic wiring diagram of FIG. 2. As there illustrated, a suitable voltage source is formed by a step-down transformer 28 having its primary winding 28a adapted for connection to a conventional 110 volt AC supply. The two extremities of its secondary winding 28b are connected through rectifying diodes 29, 30 to a line L1, and the center tap of that secondary winding is connected to a line L2 here shown at ground or reference potential. Thus, a full wave rectified, pulsating DC voltage appears between the lines L1, L2 making the former positive relative to the latter. While the voltage source employed in the exemplary arrangement in FIG. 2 thus provides a pulsating DC voltage, it will become apparent to those skilled in the art that a source of steady or smooth DC voltage may be utilized if desired.

In carrying out the invention, the temperature-sensing element or thermistor 24 is connected in a bridge configuration with three electrical elements 31, 32, 33. As noted above, the impedance, or more strictly, the resistance, of the thermistor 24 varies inversely with changes in the actual temperature of the room 10; and the three remaining elements of the bridge circuit are here shown as resistors 31, 32, 33 of the type which present substantially constant electrical impedances or resistances. The bridge circuit 35 so formed has two input terminals 35a, 35b which are adapted for connection to the voltage source between lines L1, L2 as shown. A first bridge output terminal 35c is formed between the thermistor 24 and the resistor 31, and a second output terminal 35d is formed between the resistors 32 and 33. In the preferred arrangement here illustrated, the output terminals 35c and 35d are constituted by the wipers 38a and 39a of respective potentiometers 38 and 39 interposed in series between the elements 24, 31 and 33, 32 respectively. Adjustment of the wiper 38a, which may be mechanically connected with the knob 25, affords setting of the temperature set point, as more fully explained below. Adjustment of the wiper 39a may be made to calibrate and make accurate the scale 25a of set point numbers associated with the dial or knob 25.

It will be seen that the resistor 31, the potentiometer 38, and the thermistor 24 are connected in series between the lines L1 and L2, thereby forming a voltage divider which produces a first signal voltage (principally the voltage appearing across the thermistor 24) which varies according to changes in the environmental temperature of the thermistor 24. Assuming that the wiper 38a remains in a given set position, the first signal voltage appearing on the wiper 38a and the output terminal 35c (relative to the line L2 or ground) will increase or decrease in magnitude as the second room temperature respectively falls or rises.

On the other hand, the resistor 32, potentiometer 39 and resistor 33 are connected in series between the lines L1, L2 to form a voltage divider which produces a second signal voltage that remains substantially constant in magnitude, assuming that the wiper 39a remains stationary at a given setting. This second signal voltage is, by choice of the resistance values, made approximately equal to the first signal voltage when the latter is midway between the limits of its useful range of variation.

In order to produce a final output signal Eo which can be made selectively to vary in one sense or the other in response to changes in the actual room temperature, the first and second signal voltages are applied to first and second input leads 41 and 42 of a differential amplifier 44. As here shown, the differential amplifier is constituted by two amplifying current control devices or transistors Q1 and Q2, having their main, controlled current paths connected respectively in series with load resistors 45 and 46 to the input terminals 35a and 35b of the bridge 35. This latter connection thus places each of the transistors and its load resistor in series across the voltage source between the lines L1 and L2.

More particularly, the transistors Q1 and Q2 have collectors c1 and c2, emitters e1 and e2, and bases b1 and b2, respectively. The emitter and base may be considered as the control terminals for their transistor, since the forward-biasing voltage and resulting current through the emitter-base junction determines the magnitude of the main current flow through the collector-emitter paths.

Means are provided for cross-coupling the two transistors Q1 and Q2 so that an increase of current flow through one tends to decrease the current flow through the other and vice versa. For this purpose, a common resistor 48 is connected from the two emitters e1 and e2 to the line L2 so that it carries the main current flowing through both of the two transistors. As current through the collector-emitter path of the transistor Q1 increases or decreases, the potential at the two emitters e1 and e2 tends to respectively increase or decrease, so that the base-emitter current of the transistor Q2 tends to decrease or increase, and thus the collector-emitter current of the transistor Q2 decreases or increases.

The input leads 41 and 42 for the differential amplifier serve to connect the bridge output terminals 35c and 35d to the transistor bases b1 and b2. Two output leads 49 and 50 for the differential amplifier are connected respectively to the junctions between the load resistor 45 and the collector c1 and the load resistor 46 and the collector c2. In general terms, therefore, as the sensed temperature rises or falls, the potential at the base b1 falls or rises, thereby decreasing or increasing the collector current through the transistor Q1. The amplifier output voltage on the lead 49 thus rises or falls. By contrast, as the sensed temperature rises or falls, so as to decrease or increase the collector current through the transistor Q1, the collector current flow through the transistor Q2 increases or decreases. The amplifier output voltage on the lead 50 therefore decreases or increases.

For the purpose of supplying to the power controller 22 an output signal Eo which varies in one sense or the other sense with changes in the room temperature, a simple, single-pole, double-throw switch 54 is interposed between the output leads 49, 50 and the transducer output terminal 52. As here illustrated, that switch has first and second input contacts 54a, 54b selectively engageable by a switch arm or output contact 54c connected to the terminal 52. Although the switch 54 may be manually actuated or selectively moved to winter or summer positions W and S, it is here shown as a part of the switch unit 26, having the arm 54c mechanically connected to a bi-metal element 57 responsive to the temperature of the fluid circulating in the coil 18. When that fluid is hot or cold, as a result of the heater-cooler apparatus 20 (FIG. 1) being conditioned for winter or summer operation, the bi-metal element deflects and thereby shifts the arm 54c to its winter or summer positions W or S in engagement with input contacts 54b or 54a, respectively. Thus, either the signal from the collector c2 or the signal from the collector c1 is selectively routed to the transducer output terminal 52, and thus is supplied as the input signal for the power controller 22.

The power controller 22 is shown in block form only inasmuch as it may take any desired one of several forms familiar to those skilled in the art. For example, it may be a DC power amplifier operative to increase or decrease the direct voltage and current supplied to the motor 16 as the output signal voltage Eo increases or decreases. In the present example, however, the controller 22 is preferably of the type which employs two silicon controlled rectifiers connected in inverse parallel relation between an AC voltage source and the motor 16. The silicon controlled rectifiers have input circuits for triggering them into conduction at earlier or later phase angles according to the magnitude of the pulsating output voltage $E_o$, so as to increase or decrease the effective voltage and current applied as the speed-controlling input to the motor 16 from an AC source. In any event, to complete the system here described by way of example, the controller 22 is one which operates to increase or decrease the speed of the motor 16, whether the latter is of either the DC or AC type, as the output signal $E_o$ increases or decreases in magnitude.

With the foregoing organization in mind, the operation of the transducer 21 and the system as a whole may be briefly summarized. For winter operation when the ambient temperature is less than the desired set point temperature of the room 10, hot fluid will be circulated through the coil 18, and the switch arm 54c will thus be set to its winter position W in engagement with the contact 54b, as shown in FIG. 2. If the actual temperature sensed by the thermistor 24 is substantially equal to the desired temperature represented by the setting of the knob 25 and the potentiometer wiper 38a, then the first and second signal voltages at the bridge output terminals 35c, 35d will be substantially equal in magnitude. These signal voltages are applied to the bases of the respective transistors Q1 and Q2, and the current flow through those transistors will be substantially equal. Accordingly, the magnitude of the pulsating voltage which appears at the collector c2 and is transferred via the lead 50 and the switch 54 to the terminal 52 will have an equilibrium value which causes the power controller 22 to energize the motor 16 and drive the fan 15 at a speed which is just sufficient to heat the room 10 at a rate which makes up for heat losses.

If for any reason the temperature in the room should increase above or decrease below the desired value, then the resistance of the thermistor 24 will decrease or increase, and the potential at the output terminal 35c will decrease or increase, respectively. As a result, the current flow through the transistor Q1 will decrease or increase, respectively, and, because the potential at the bridge output terminal 35d and the base b2 remains substantially constant, the common emitter resistor 48 will cause the current flow through the transistor Q2 to increase or decrease. Thus, the voltage drop across the load resistor 46 will increase or decrease, and the output voltage $E_o$ at the terminal 52 will decrease or increase. Therefore, the speed of the motor 16 and the fan 15 will decrease or increase in response to the sensed temperature rising above or falling below the set point value. In these circumstances, the rate of heating of the room 10 will be decreased or increased so that the actual temperature falls (due to heat losses) or rises (due to increased rate of heating) back to the set point value.

If the same connections and operation were maintained under summer operating conditions when cold fluid is circulated through the heat exchanger coil 18, then the system would work improperly and, indeed, in a manner directly opposite to that which is desired. For example, with the ambient temperature greater than the desired room temperature, and with cold fluid circulated through the coil 18, if the sensed temperature rose above the desired value and the speed of the fan 15 were decreased, then the rate of cooling would be decreased and the room temperature would rise even more due to absorption of heat from the outdoors.

With the present thermostatic transducer, it is only necessary to actuate the single switch 54 to its summer position in order to achieve proper control action for summer operation. Although such switch actuation may be performed manually, it is here accomplished automatically by the bi-metal element 57 as soon as the fluid circulating in the coil 18 becomes cool and signals that summer operation is required. This places the switch arm 54c in engagement with the contact 54a (FIG. 2) so that the voltage variations at the collector c1 are transferred via the lead 49 to the output terminal 52 and the power controller 22.

With this change having been made, and remembering that cooling fluid is now being circulated through the coil 18, it will be seen that as the actual temperature of the room 10 rises above or falls below the set point value, the resistance of the thermistor 24 will decrease or increase, thus decreasing or increasing the potential of the base b1, and respectively reducing or increasing the current flow through the transistor Q1. As a result, the output voltage on the lead 49 of the differential amplifier will increase or decrease so that the power controller 22 will cause the motor 16 to drive the fan 15 at a faster or slower speed. Thus, the rate of cooling will be increased or decreased by a greater or lesser air flow whenever the room temperature tends to rise above or fall below the desired value. This is the proper operation for temperature control in the summer mode of operation and it is obtained because the relatively simple and inexpensive transducer makes it possible to reverse the sense of output signal change, resulting from a change in actual temperature, simply by throwing the switch arm 54c from its winter to its summer position.

It will be understood that by manually repositioning the knob 25 and the potentiometer wiper 38a, the first signal voltage at the bridge output terminal 35c may be increased or decreased, assuming that the temperature sensed by the thermistor 24 remains the same. This produces the same control action described above, and causes a corrective change in the room temperature until the resistance of the thermistor 24 changes to bring the first signal voltage at the terminal 35c back to a steady state value. Therefore, by selectively setting the potentiometer wiper 38a to different positions, one can establish different set point temperatures which will be automatically maintained during either winter or summer operation.

If the steady state temperature which is obtained in the room 10 does not agree with the value of the set point indicated on the scale 25a associated with the knob 25, then the potentiometer wiper 39a may be repositioned until the actual temperature agrees with the indicated set point temperature. By adjusting the wiper 39a the otherwise constant potential applied to the base b2 of the transistor Q2 may be increased or decreased. This will change the value of the thermistor resistance which must be produced by the actual room temperature in order to bring the system to steady state equilibrium. The calibration potentiometer 39 thus affects both the winter output signal appearing on the output lead 50 and the summer output signal appearing on the lead 49 of the differential amplifier, and it is effective for calibration adjustments in both winter and summer modes of operation.

As shown in FIG. 2, a throttling rheostat is connected between the collector and base of the transistor Q1. By adjusting this rheostat and the effective resistance which it presents, the gain of the transistor Q1 may be varied so that the range of the first signal voltage variation at the bridge output terminal 35c necessary to swing the amplifier output signals between their maximum and minimum limits can be adjusted. Thus, simply by adding a simple gain-changing rheostat 55 to the differential amplifier 44, the throttling range of the transducer and the control system may be made readily adjustable.

The proportional thermostatic transducer described above is thus revealed as one which is very simple and inexpensive in its construction, yet reliable and accurate in its operation. It requires only a single, standard and simple temperature-sensitive element, such as the thermistor 24, which functions as the basic temperature-sensing means during both winter and summer modes of operation. The remaining principal components of the transducer are ordinary resistors, potentiometers, transistors, and a standard single-pole, double-throw switch. It requires only manual or automatic repositioning of a selector switch form one position to another in order to convert the transducer from winter to summer operation, or vice versa. Yet, the set point may be conveniently adjusted during both winter and summer operation, and the set point scale can be accurately calibrated by adjusting a single potentiometer during either the winter or summer mode of operation. And, in either mode, the throttling range may also be varied by means of a simple rheostat.

In the foregoing description and in the claims which follow, reference is made to "winter" operation or "summer" operation. Such terminology is convenient and graphic, but is not to be construed as limiting. On the contrary, it is to be understood that the term "winter" operation designates circumstances where controlled temperature is increased by increasing the rate of heat transfer from the heat energy source, and the temperature is decreased by reducing such rate of heat transfer so that losses to cooler surroundings result in a temperature drop. Similarly the term "summer" operation designates circumstances where the controlled temperature is decreased by increasing the rate of cooling due to heat absorption by a cooling source, and temperature is increased by decreasing the rate of cooling so that heat absorption from warmer surroundings cause a temperature rise.

I claim as my invention:

1. In a thermostatic transducer for winter and summer operation, the combination comprising a temperature-sensitive electrical element; means for connecting said element to a voltage source so that a first signal voltage across the element varies according to changes in its environmental temperature; means for establishing a second, substantially constant signal voltage which is approximately equal to the first signal voltage when the latter is midway between the limits of its useful range of variation; a differential amplifier including first and second current control devices connected in series respectively with first and second load resistors across said voltage source, and means for cross-coupling said control devices so that a decrease in conduction by one tends to increase conduction by the other; means for applying said first and second signal voltages as controlling inputs respectively to said first and second control devices; an output terminal; and means including a single-pole, double-throw switch for selectively connecting said output terminal either to the junction between said first control device and said first load resistor or to the junction between said second control device and said second load resistor.

2. In a thermostatic transducer for winter and summer operation, the combination comprising a temperature-sensitive electrical element whose impedance varies according to its environmental temperature, a bridge circuit having two input terminals adapted for connection to a voltage source and having two output terminals, said bridge circuit including three electrical impedance elements and said temperature-sensitive element connected in a bridge configuration between said input and output terminals, a differential amplifier having two input leads and two output leads with the input leads connected respectively to said bridge circuit output terminals, and a single-pole, double-throw changeover switch having two input contacts and a common output contact, said input contacts being connected respectively to said output leads; whereby the sense of the proportional change in the signal at said output contact in response to a change in the said environmental temperature is in one sense or the other when said changeover switch is respectively thrown to one or the other of its two positions.

3. The combination set forth in claim 2 further characterized in that said differential amplifier comprises two transistors each having a collector, an emitter and a base; load resistors respectively connected from said collectors to one terminal of said voltage source; a common resistor connecting both of the emitters to the other terminal of the voltage source; said input leads being connected respectively to said bases; and said output leads for the differential amplifier being connected respectively to the two collectors.

4. The combination set forth in claim 2 further characterized by first and second potentiometers connected in said bridge configuration with movable wipers respectively forming said two output terminals, one of said wipers being movable for set point adjustment and the other being movable for calibration adjustment.

5. The combination set forth in claim 3, further characterized by a rheostat connected between the collector and base of one of said transistors and adjustable to vary the gain of the differential amplifier and the throttling range of signal variation at said output contact.

6. In a thermostatic transducer for winter and summer operation, the combination comprising an electrical temperature-sensitive element whose resistance varies according to its environmental temperature; a bridge circuit having first and second input terminals adapted for connection to a voltage source and having first and second output terminals; said bridge circuit including two resistors connected in series between said input terminals with said first output terminal formed therebetween, and further including another resistor connected in series with said element between said input terminals with said second output terminal formed therebetween, whereby the voltage at said first output terminal relative to one of said input terminals remains substantially constant and the voltage at said second output terminal relative to said one input terminal varies according to said environmental temperature; two transistors each having a collector and two control terminals constituted by an emitter and a base; two load resistors respectively connecting the two collectors to one of said input terminals; a common resistor connecting one like control terminal of each transistor to the other of said input terminals; means respectively connecting said first and second output terminals to the remaining control terminals of said two transistors; and a two-position, single-pole switch having two input contacts respectively connected to the collectors of said two transistors, and having a single output contact selectively connectable to said input contacts when the switch is thrown to its two respective positions, so that the signal on said output contact varies in one sense or the other in response to changes in said environmental temperature when said switch is thrown to its two respective positions.

References Cited

UNITED STATES PATENTS

| | | | |
|---|---|---|---|
| 3,102,183 | 8/1963 | Harrison | 219—20 |
| 3,136,877 | 6/1964 | Heller | 219—499 |
| 3,175,077 | 3/1965 | Fox et al. | 219—494 |
| 3,243,609 | 3/1966 | Kompelien | 165—26 X |
| 3,315,892 | 4/1967 | Haake | 236—78 X |

JOHN F. COUCH, *Primary Examiner.*

A. D. PELLINEN, *Assistant Examiner.*